US011912018B2

(12) United States Patent
Srikantom et al.

(10) Patent No.: US 11,912,018 B2
(45) Date of Patent: Feb. 27, 2024

(54) CONTINUOUS MODE PRINTING

(71) Applicant: Hewlett-Packard Development Company, L.P., Spring, TX (US)

(72) Inventors: Murthy Srikantom, Vancouver, WA (US); Weiyun Sun, Vancouver, WA (US); Stephen J. Nichols, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 290 days.

(21) Appl. No.: 16/849,176

(22) Filed: Apr. 15, 2020

(65) Prior Publication Data

US 2021/0323320 A1 Oct. 21, 2021

(51) Int. Cl.
*B41J 11/00* (2006.01)

(52) U.S. Cl.
CPC ................................. *B41J 11/0095* (2013.01)

(58) Field of Classification Search
CPC ...... B41J 2/2114; B41J 11/0095; B41J 29/38; B41J 2/2117; B41J 29/393; B41J 13/0009; B41J 11/007; B41J 11/42; B41J 15/04; B41J 25/308; B41J 11/00
See application file for complete search history.

(56) References Cited

U.S. PATENT DOCUMENTS

| | | | | |
|---|---|---|---|---|
| 5,878,320 | A | 3/1999 | Stemmle | |
| 6,404,507 | B1 | 6/2002 | Hamamoto et al. | |
| 7,377,609 | B2 | 5/2008 | Walmsley et al. | |
| 7,914,099 | B2 * | 3/2011 | Loh | B41J 11/0095 347/16 |
| 8,264,732 | B2 | 9/2012 | Anderson et al. | |
| 9,684,859 | B2 | 6/2017 | Mader et al. | |
| 2010/0091056 | A1 * | 4/2010 | Miyagi | B41J 2/16585 347/16 |
| 2018/0244048 | A1 * | 8/2018 | Ito | B41J 11/0095 |
| 2019/0193430 | A1 * | 6/2019 | Sato | B41J 11/425 |

FOREIGN PATENT DOCUMENTS

JP 6428751 B2 11/2018

* cited by examiner

*Primary Examiner* — Jannelle M Lebron
(74) *Attorney, Agent, or Firm* — Brooks, Cameron & Huebsch, PLLC

(57) ABSTRACT

A print job having a number of pages is printed in a continuous mode, on media advanced at a constant speed. The print job can thus be effectively treated as having a single page. The media that are advanced for printing the print job can similarly be effectively treated as being a single medium.

15 Claims, 15 Drawing Sheets

CONTINUOUS MODE PRINTING

BACKGROUND

Digital printing devices form images on media by selectively printing colorant, such as ink or toner, onto the media in accordance with received data. As digital printing devices have become faster and more reliable, robust, and cost effective, they have even begun to supplant analog printing devices that use offset printing, screen printing, and other analog printing techniques to form images on media. This is particularly the case in commercial, print shop, and industrial contexts that often print on media other than typical sheets of paper, such as cardboard boxes, letter as well as packaging envelopes, paper grocery bags, and so on.

DETAILED DESCRIPTION

Digital printing devices can be used in lieu of analog printing devices to form images on a wide variety of media.

In such contexts, the media may be individually loaded onto a belt or rollers for advancement towards printing hardware positioned over the belt or rollers. As each medium passes through a print zone under the printing hardware, the printing hardware forms an image on the medium, such as on a line-by-line basis using a pagewide-array printing mechanism like an array of inkjet printheads.

Techniques described herein provide for continuous mode printing in these and other types of printing devices. In continuous mode printing, the media are continuously advanced at a constant speed, and loading of media onto the belt or rollers may not stop until a print job has finished. The printing hardware may treat the print job as having one page of indefinite length, without distinguishing among individual media and their respective actual pages of the print job. Continuous mode printing can increase throughput, and even improve printing hardware reliability by in effect printing even between media when no media is currently in the print zone.

Figure 1:
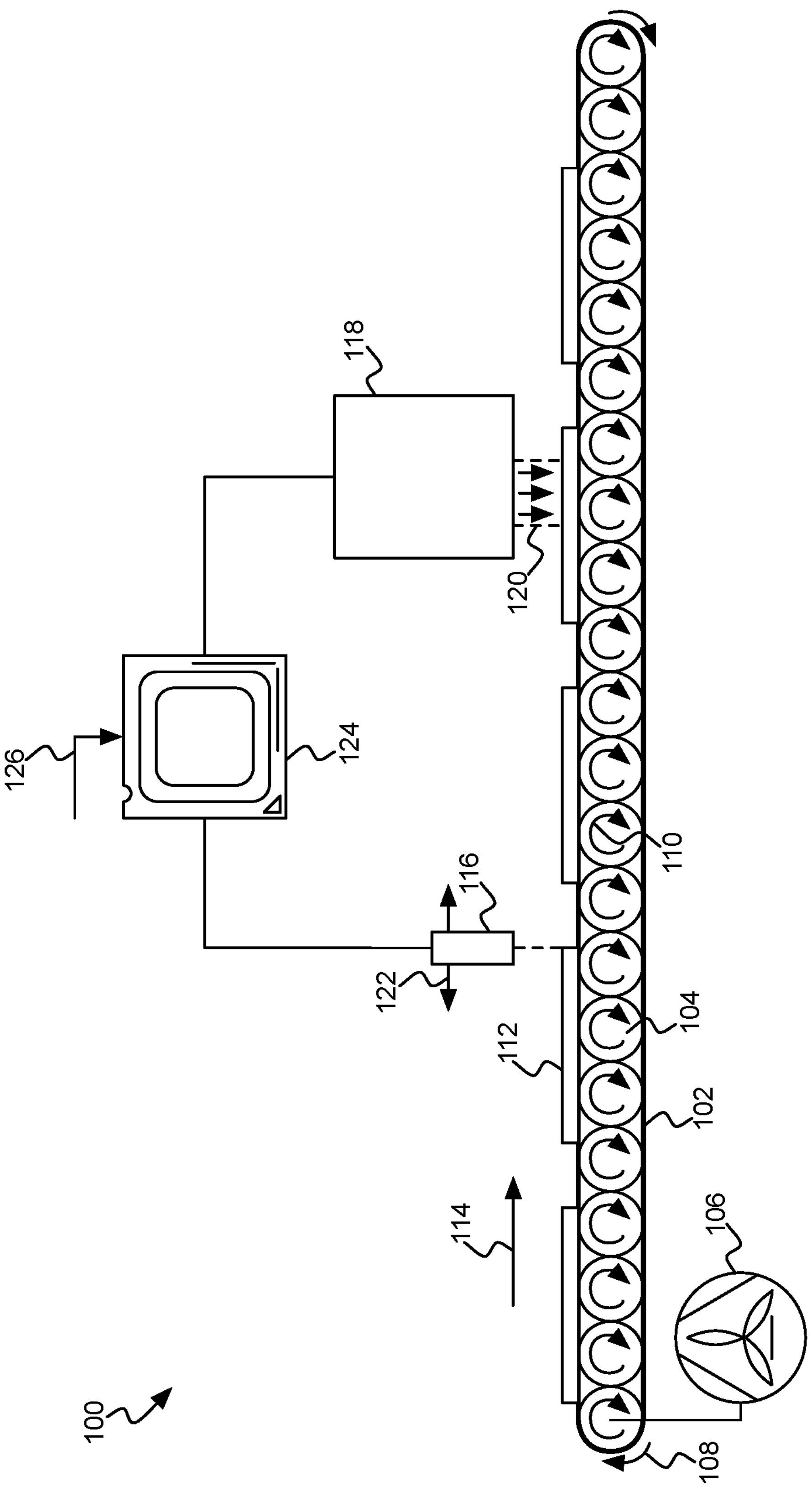
FIG. 1 is a diagram of an example printing system that can perform continuous mode printing.

FIG. 1 shows an example printing system 100 for continuous mode printing. The printing system 100 can include a belt 102 and/or rollers 104 that a motor 106 of the system 100 rotates in a clockwise direction per respective arrows 108 and 110, to advance media 112 loaded on the belt 102 and/or rollers 104 per arrow 114. The motor 106 rotates the belt 102 and/or the rollers 104 at a constant angular speed during continuous mode printing to continuously advance the media 112 at a corresponding constant linear speed.

The media 112 can each be of equal length from left to right in FIG. 1. The media 112 may be individually loaded on the belt 102 and/or rollers 104 manually or in an automated manner. The media 112 may be loaded at a relatively constant frequency so that the gap between adjacent media 112 on the belt 102 and/or rollers 104 is roughly but not precisely constant. The media 112 may be sheets of media like paper, as well as less common media such as letter or packaging envelopes, flattened or assembled cardboard boxes, flattened paper grocery bags, and so on. The media 112 may be continually loaded until a print job has finished being printed in a continuous mode.

The printing system 100 includes a leading edge sensor 116 and printing hardware 118. The leading edge sensor 116 may be an optical or other sensor, and detects leading edges of the media 112 as the media 112 are advanced past the sensor 116. The printing hardware 118 may print on the media 112 as the media 112 are advanced through a print zone incident to the hardware 118 and between the printing hardware 118 and the belt 102 or rollers 104. The printing hardware 118 may print on the media 112 on a line-by-line basis, one line at a time, and thus may include a pagewide array of printheads such as inkjet printheads that eject ink or other print fluid.

The distance between the leading edge sensor 116 and the print zone 120 may vary depending on the particular printing system 100 or may be modifiable within the system 100 itself, per arrows 122, and is known and thus configurable. Therefore, upon the sensor 116 detecting the position of the leading edge of a medium 112 on the belt 102 and/or rollers 104, when that leading edge has reached the print zone 120 can be determined because the medium 112 advances at constant speed on the belt 102 and/or rollers 104. The distance between the leading edge sensor 116 and the print zone 120 may be configurable between print jobs, but is static while the print job is being printed in the continuous mode.

The print job has a number of pages, with each page printed on a different medium 112. Each page of the print job has corresponding page data that the printing hardware 118 is provided to print on a medium 112. In the continuous mode, the printing hardware 118 prints on the media 112 without the belt 102 or rollers 104 stopping until the print job has been completed. The printing hardware 118 may treat the print job as having a single page, and may not distinguish between pages of the print job or the media 112. That is, the printing hardware 118 can engage in printing—albeit of blank lines—even when no medium 112 is currently advancing through the print zone 120.

The print job may be of indefinite length. That is, when the printing hardware 118 starts printing the print job, the number of pages that the print job includes may not be known. Page data for additional pages may be continuously added to the print job, for instance, while printing is occurring. The printing hardware 118 keeps printing until the last page of the print job has been printed. The print job may be received from a host computing device or retrieved from a data storage device. The host computing or data storage device may be communicatively connected to or part of the printing system 100.

The printing system 100 can include logic hardware 124. The logic hardware 124 can be implemented just in hardware or in a combination of hardware and software. For example, the logic hardware 124 may include an application-specific integrated circuit (ASIC) that is programmed according to program code. As another example, the logic hardware 124 may include a general-purpose processor that executes program code.

The logic hardware 124 is communicatively connected to the leading edge sensor 116 and the printing hardware 118. The logic hardware 124 can further communicatively receive a print job from a host computing device or a data storage device, as indicated by arrow 126. The logic hardware 124 causes the printing hardware 118 to print on the media 112 in a continuous mode in which the belt 102 and the rollers 104 are not stopped until the print job has been completed.

Figure 2:
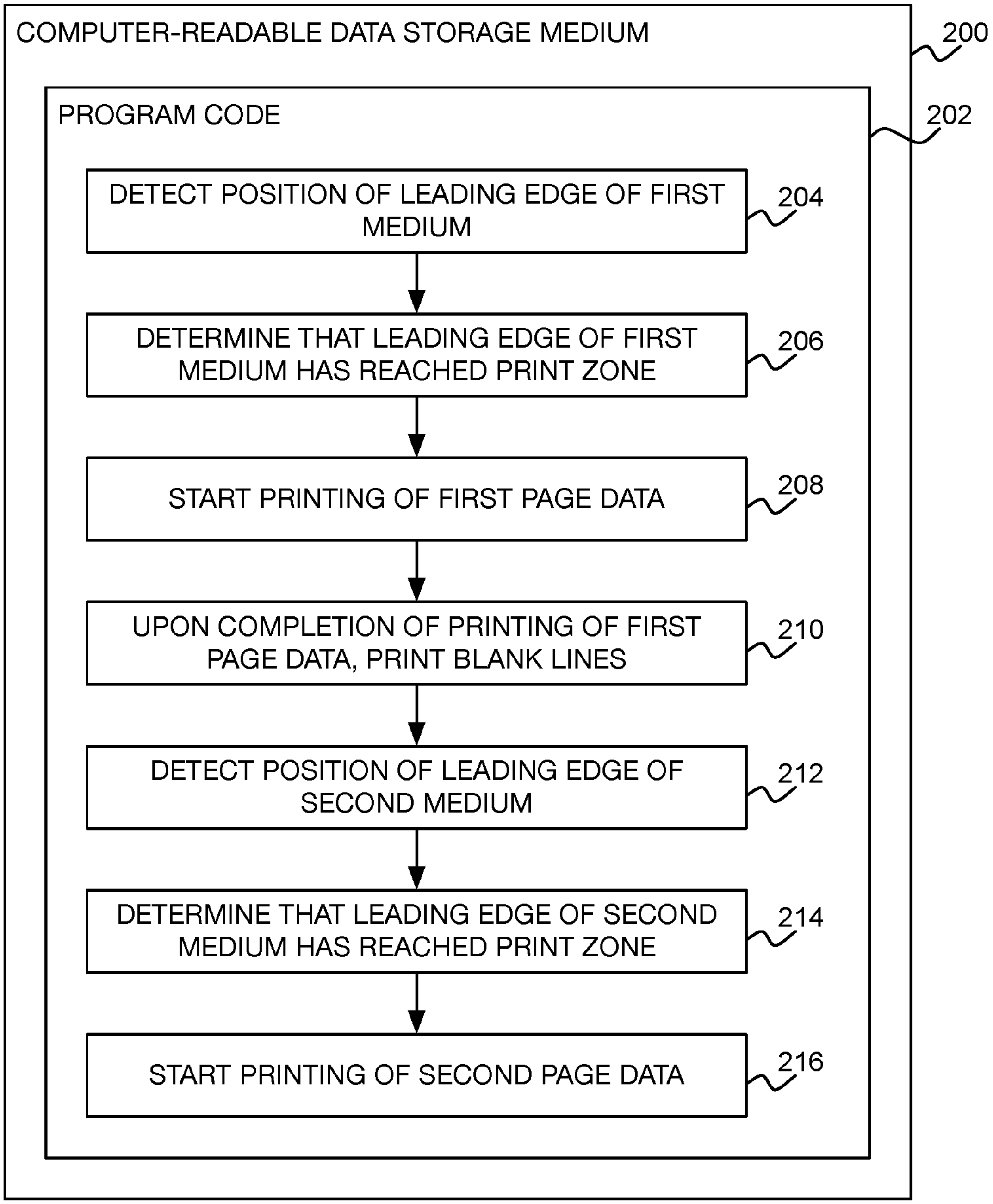
FIG. 2 is a diagram of an example computer-readable data storage medium for performing processing for continuous mode printing of page data on media in a case in which a leading edge of a medium is detected after page data for a prior medium has finished being printed.

FIG. 2 shows an example non-transitory computer-readable data storage medium 200 storing program code 202 executable for performing processing for continuous mode printing of page data on media in a case in which a leading edge of a medium is detected after page data for a prior medium has finished being printed. A processor can execute the program code 202 to perform the processing. The processor may be a part of a controller, for instance, that is communicatively connected to both the leading edge sensor and the printing hardware of a printing system. The controller may further be communicatively connected to the host computing or data storage device that provides the page data for the pages of a print job. For instance, the controller may be the logic hardware 124 of FIG. 1.

The processing includes detecting the position of the leading edge of a first medium that is advancing towards a print zone (204). Specifically, the processor that executes the program code detects the position of the medium's leading edge in that the processor receives indication from the leading edge sensor that the sensor detected the leading edge. The processing includes determining when the leading edge of the first medium has reached the print zone (206), based on the detected position of the leading edge. Media including the first medium advance towards the print zone at constant zone, and the distance between the leading edge sensor and the print zone is known, which permit this determination to be made.

Upon detection of the position of the leading edge of the first medium and responsive to determining that the leading edge has reached the print zone, the processing includes starting printing of first page data (208). The first page data is the page data for a first page of the print job, which is thus printed on the first medium. The processor that executes the program code may print the first page data by providing the printing hardware with the first page data on a line-by-line basis in correspondence with advancement of the first medium through the print zone. For instance, the processor may cause the printing hardware to print successive lines of the first page data as the first medium is advanced through the print zone.

Printing of the first page data may be completed coincident with the first medium exiting the print zone. That is, the number of lines of page data of each page may correspond to the length of each medium. Upon completion of printing of the first page data, the processing includes printing blank lines (210). The processor that executes the program code may print the blank lines by providing the printing hardware with lines of blank page data, such as by causing the printing hardware to print such successive blank page data lines. Blank lines are continuously printed until the position of the leading edge of a second medium has been detected and it has been determined that this leading edge has reached the print zone.

As such, the processing includes detecting the position of the leading edge of the second medium advancing towards the print zone (212), in the same manner in which the leading edge of the first medium was detected. The processing includes determining that the leading edge of the second medium has reached the print zone (214), based on the leading edge's detected position, in the same manner in which the first medium's leading edge was determined as having reached the print zone. At that time blank lines are no longer printed. Instead, the processing includes starting printing of second page data (216), in the same manner in which the first page data was printed. The second page data is the page data for a second page of the print job, and is printed on the second medium.

Figure 3:
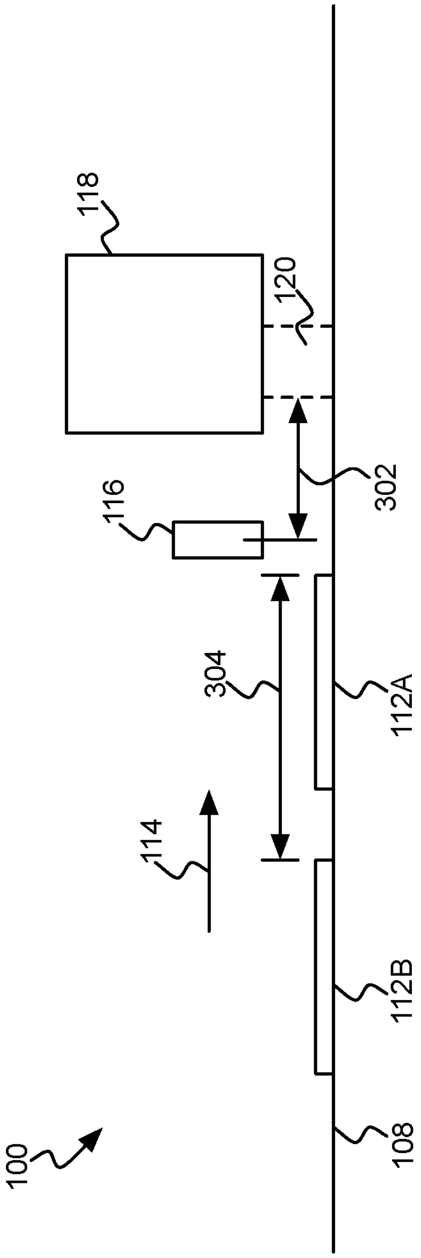
FIG. 3 is a diagram of example performance of the processing of FIG. 2.

FIG. 3 shows example performance of the processing of FIG. 2 in relation to the printing system 100, a portion of which is depicted in FIG. 3. A first medium 112A and a second medium 112B are being advanced on the belt 102 towards the print zone 120 incident to the printing hardware 118, per arrow 114. In the example of FIG. 3, the distance 302 between the leading edge sensor 116 and the print zone 120 (viz., the distance at which media leading edges are detectable in advance of the print zone 120) is less than the distance 304 between the leading edges of the media 112A and 112B (viz., the inter-media distance of media advancing towards the print zone 120).

Upon the leading edge of the first medium 112A being detected, printing of the first page data commences once it has been determined that this leading edge has reached the print zone 120. When the first medium 112A exits the print zone 120, such that printing of the first page data has been completed, the leading edge of the second medium 112B has not yet been detected. This is because the distance 302 is less than the distance 304. Blank lines are printed until the leading edge of the second medium 112B has been detected by the leading edge sensor 116 and further until the leading edge has been determined as having reached the print zone 120. Printing of the second page data by the printing hardware 118 then commences.

Figure 4:
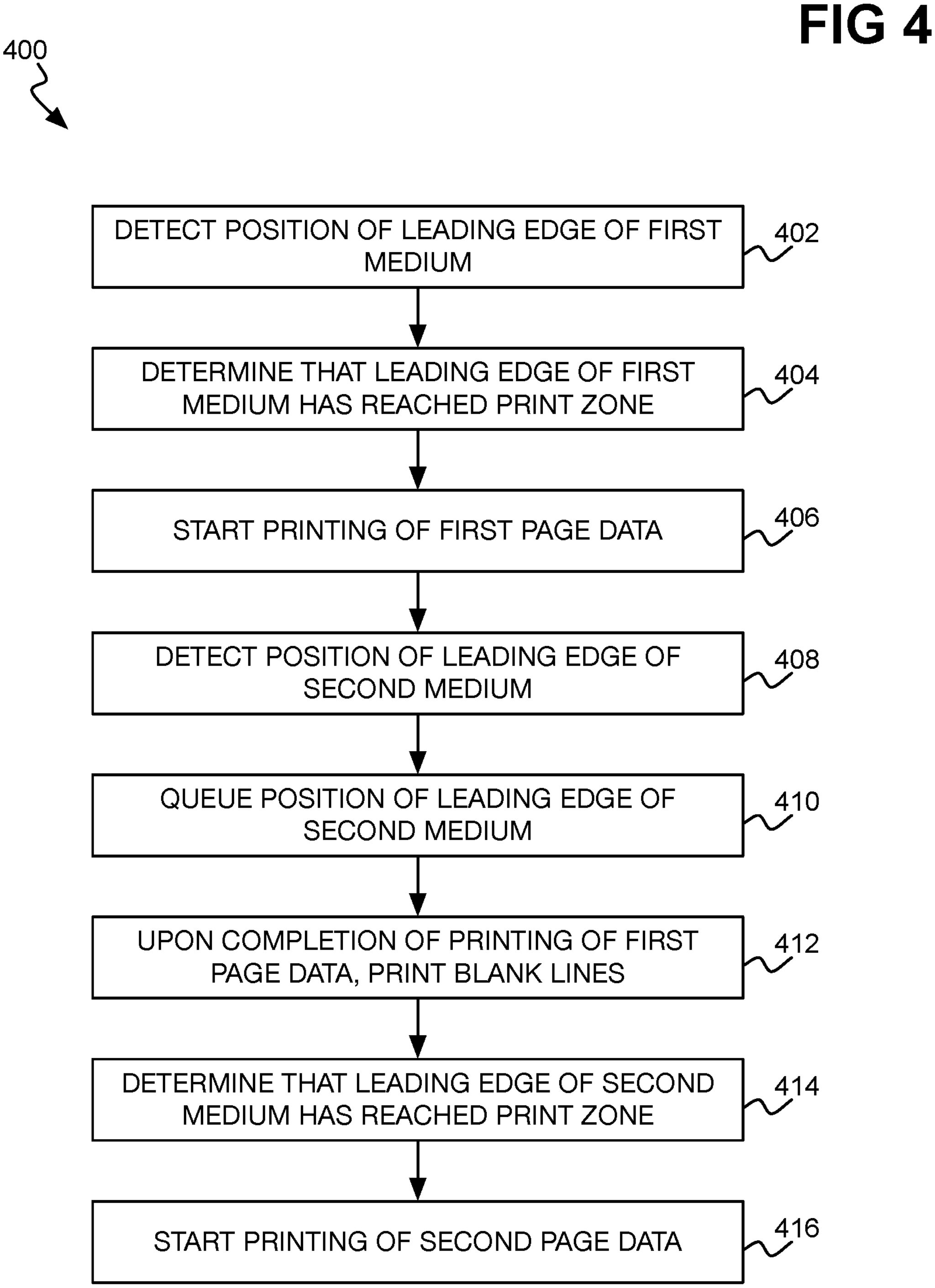
FIG. 4 is a flowchart of an example method for continuous mode printing of page data on media in a case in which a leading edge of a medium is detected before page data for a prior medium has finished being printed.

FIG. 4 shows an example method 400 for continuous mode printing of page data on media in a case in which a leading edge of a medium is detected before page data for a prior medium has finished being printed. The processor that executes the program code of FIG. 2 can also perform the method 400. The method 400 can be performed with the processing of FIG. 2 in the same implementation, in which case the second medium of the processing of FIG. 2 can be a first medium of the method 400, with an additional, third medium being a second medium of the method 400.

The method 400 includes detecting the position of the leading edge of a first medium that is advancing towards a print zone (402), and determining that the leading edge has reached the print zone (404), based on the detected position. Upon detection of the position of the leading edge of the first medium and responsive to determining that the leading edge has reached the print zone, the method 400 includes starting printing of first page data (406). Prior to printing of the first page data have been completed, however, the position of the leading edge of a second medium advancing towards the print zone is detected (408).

The detected position of the leading edge of the second medium is queued (410), until printing of the first page data has been completed. The position of the leading edge of the second medium and the ensuing queuing of this detected position may occur prior to the leading edge of the first medium being determined as having reached the print zone and thus prior to printing of the first page data. That is, parts 408 and 410 of the method 400 may occur before part 404. Most generally, the position of the second medium's leading edge is detected prior to starting or completion of printing of the first page data. Furthermore, leading edges of third, fourth, and so on, media may also be detected and thus queued prior to starting or completion of printing of the first page data.

Upon completion of printing of the first page data, the method 400 includes printing blank lines (412). Blank lines are continuously printed until the position of the leading edge of the second medium has been determined as having reached the print zone. As such, the method 400 includes determining that the leading edge of the second medium has reached the print zone (414), based on the detected position of the leading edge as was previously queued. At that time, blank lines are no longer printed, and instead the method 400 includes starting printing of second page data (416).

The number of blank lines to be printed in part 412 can be determined ahead of time, as early as when the leading edge of the second medium is detected. This is because the leading edge of the second medium is detected before printing of the first page data has been completed (or even started in another case). By comparison, the number of blank lines printed in part 210 of FIG. 2 cannot be determined ahead of time, because the leading edge of the second medium has not been detected when printing of the first page data finishes.

Figure 5:
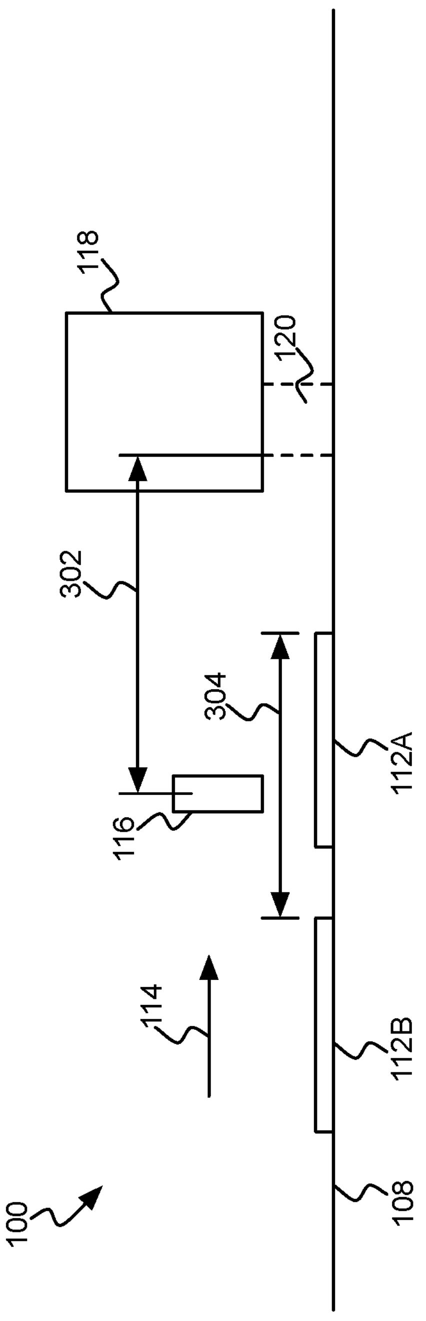
FIG. 5 is a diagram of example performance of the method of FIG. 4.

FIG. 5 shows example performance of the processing of FIG. 4 in relation to the printing system 100, a portion of which is depicted in FIG. 5. The first medium 112A and the second medium 112B are being advanced on the belt 102 towards the print zone 120 incident to the printing hardware 118, per arrow 114. In the example of FIG. 5, the distance 302 between the leading edge sensor 116 and the print zone 120 (viz., the distance at which media leading edges are detectable in advance of the print zone 120) is greater than the distance 304 between the leading edges of the media 112A and 112B (viz., the inter-media distance of media advancing towards the print zone 120).

Upon the leading edge of the first medium 112A being detected, printing of the first page data commences once it has been determined that this leading edge has reached the print zone 120. The leading edge of the second medium 112B is detected before printing of the first page data has started or has been completed, depending on how much greater the distance 302 is compared to the distance 304. When the first medium 112A exits the print zone 120, blank lines are printed until the leading edge of the second medium 1126 has been determined as having reached the print zone 120. Printing of the second page data by the printing hardware 118 then commences.

Figure 6:
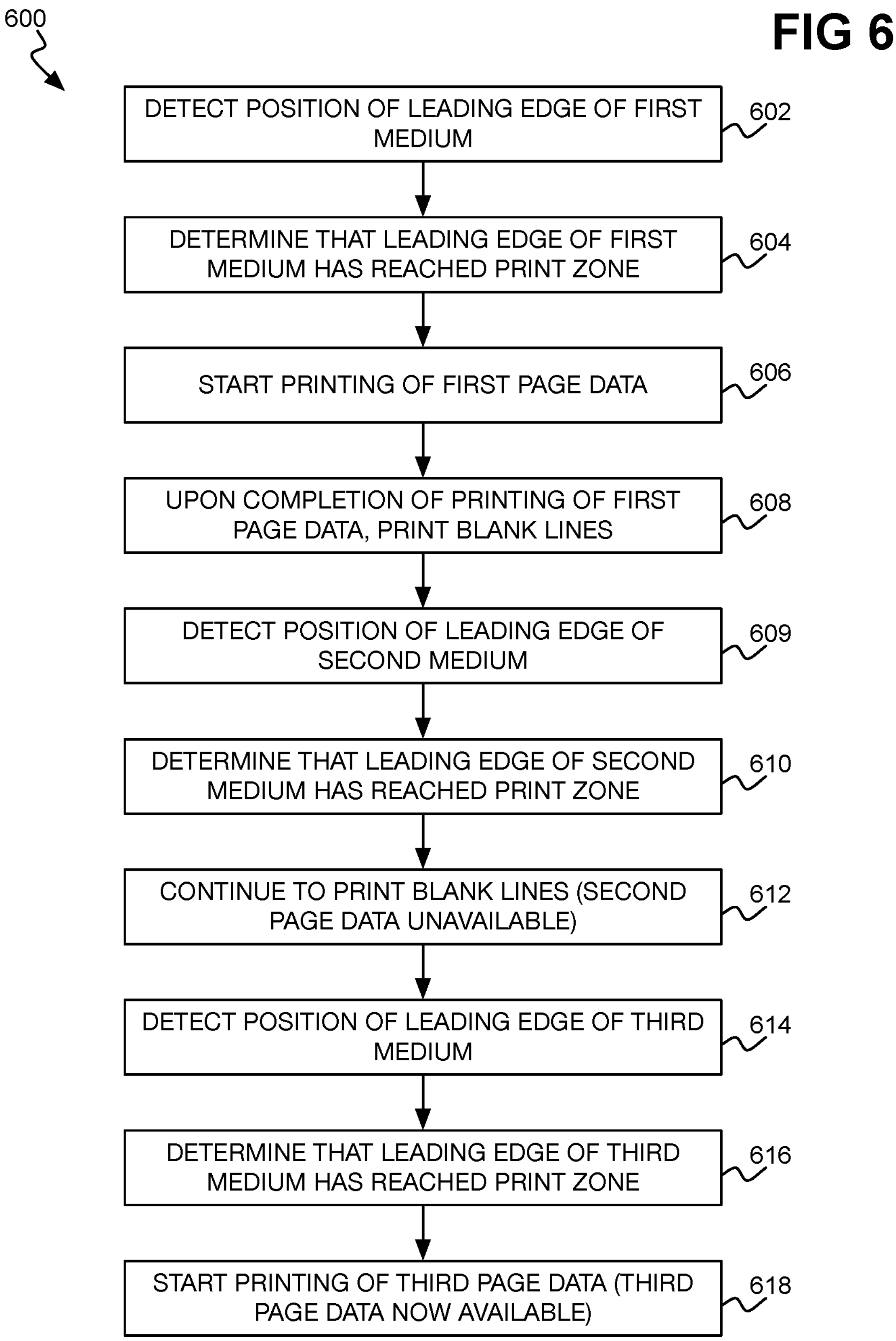
FIG. 6 is a flowchart of an example method for continuous mode printing in a case in which page data for printing on a medium is unavailable when a leading edge of the medium has reached the print zone.

FIG. 6 shows an example method 600 for continuous mode printing in a case in which page data for printing on a medium is unavailable when the leading edge of the medium has reached the print zone. The processor that executes the program code of FIG. 2 can also perform the method 600. The method 600 can be performed with the processing of FIG. 2 in the same implementation, in which case the second medium of the processing of FIG. 2 can be a first medium of the method 600, with additional third and fourth media respectively being second and third media of the method 600. The method 600 can also be performed with the method of FIG. 4 in addition to or in lieu of the processing of FIG. 2.

The method 600 includes detecting the position of the leading edge of a first medium that is advancing towards a print zone (602), and determining that the leading edge has reached the print zone (604). Upon detection of the position of the leading edge of the first medium and responsive to determining that the leading edge has reached the print zone, the method 600 includes starting printing of first page data (606). In the example of FIG. 6, upon completion of printing of the first page data, the processing includes printing blank lines (608), after which the position of the leading edge of a second medium that is advancing towards the print zone is detected (609).

The position of the leading edge of the second medium may instead be detected prior to completion or starting of printing of the first page data. For instance, the position of the second medium's leading edge may be detected between parts 606 and 608, after printing of the first page data has started but before such printing has been completed. As another example, the position of the leading edge of the second medium may be detected between parts 602 and 604, after the position of the leading edge of the first medium has been detected but before the first medium's leading edge has reached the print zone and printing of the first page data has started.

The method 600 includes determining that the leading edge of the second medium has reached the print zone (610), based on the detected position of the leading edge. At that time, however, the second page data that would otherwise start being printed on the second medium has not yet been received in the example of FIG. 6. That is, the second page data is unavailable. Therefore, the method 600 includes continuing to print blank lines (612). No page data is printed on the second medium, and the second medium continues being advanced through the print zone.

The method 600 includes detecting the position of the leading edge of a third medium that is advancing towards the print zone (614), and determining that the third medium's leading edge has reached the print zone (616), based on the detected leading edge. By this time, the second page data has been received in the example of FIG. 6. That is, the second page data is now available. Therefore, blank lines are no longer printed, and instead the method 600 includes responsively starting print of the second page data (618), but on the third medium.

If at the time the leading edge of the third medium had reached the print zone the second page data was still unavailable, then no page data would be printed on the third medium either. In general, media advancement is not stopped even if page data is unavailable when the leading edge of any medium on which the page data would otherwise be printed has reached the print zone. Rather, blank lines continue to be printed until the page data is available when the leading edge of a medium has reached the print zone.

Figure 7:
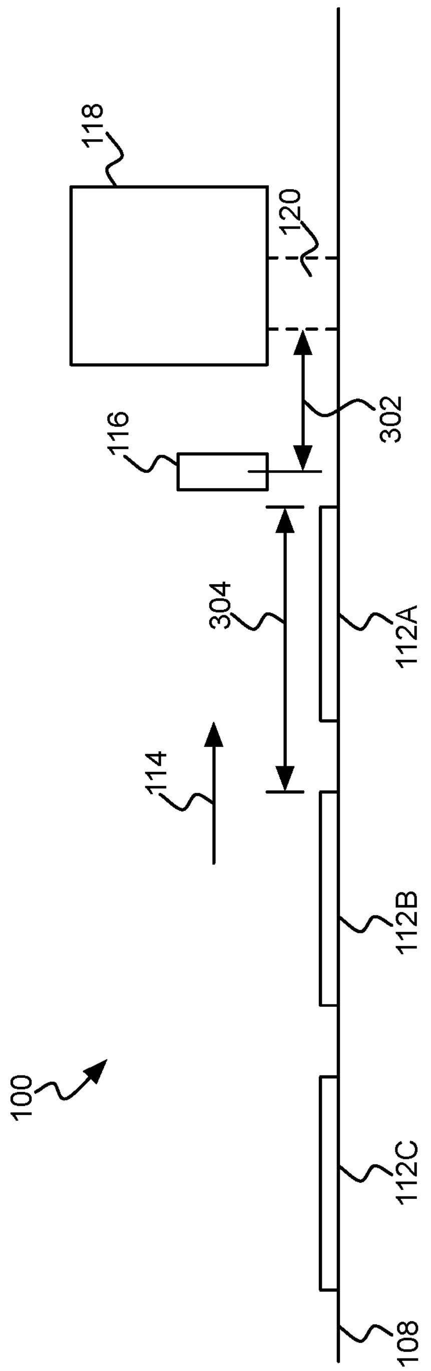
FIG. 7 is a diagram of example performance of the method of FIG. 6.

FIG. 7 shows example performance of the processing of FIG. 6 in relation to the printing system 100, a portion of which is depicted in FIG. 7. First, second, and third media 112A, 112B, and 112C are being advanced on the belt 102 towards the print zone 120 incident to the printing hardware 118, per arrow 114. In the example of FIG. 6, the distance 302 between the leading edge sensor 116 and the print zone is less than the distance 304 between the leading edges of the media 112A and 112B, as in FIG. 3. However, the distance 302 may instead be greater than the distance 304, as in FIG. 5.

Upon the leading edge of the first medium 112A being detected, printing of the first page data commences once it has been determined that this leading edge has reached the print zone 120. After the first medium 112A exits the print zone 120, blank lines are printed until the leading edge of the second medium 112B has been detected by the leading edge sensor 116 and further until the leading edge has been determined as having reached the print zone 120. However, at that time the second page data that would otherwise be printed on the second medium 112B is unavailable in the example of FIG. 7.

Therefore, blank lines continue to be printed, until the leading edge of the third medium 112C has been detected by the leading edge sensor 116 and further until the leading edge has been determined as having reached the print zone 120. No page data is printed on the second medium 112B as the medium 1126 is advanced through the print zone. At the time the leading edge of the third medium 112C has reached the print zone, the second page data is now available in the example of FIG. 7, and printing of the third page data on the medium 112C by the printing hardware 118 commences.

Figure 8:
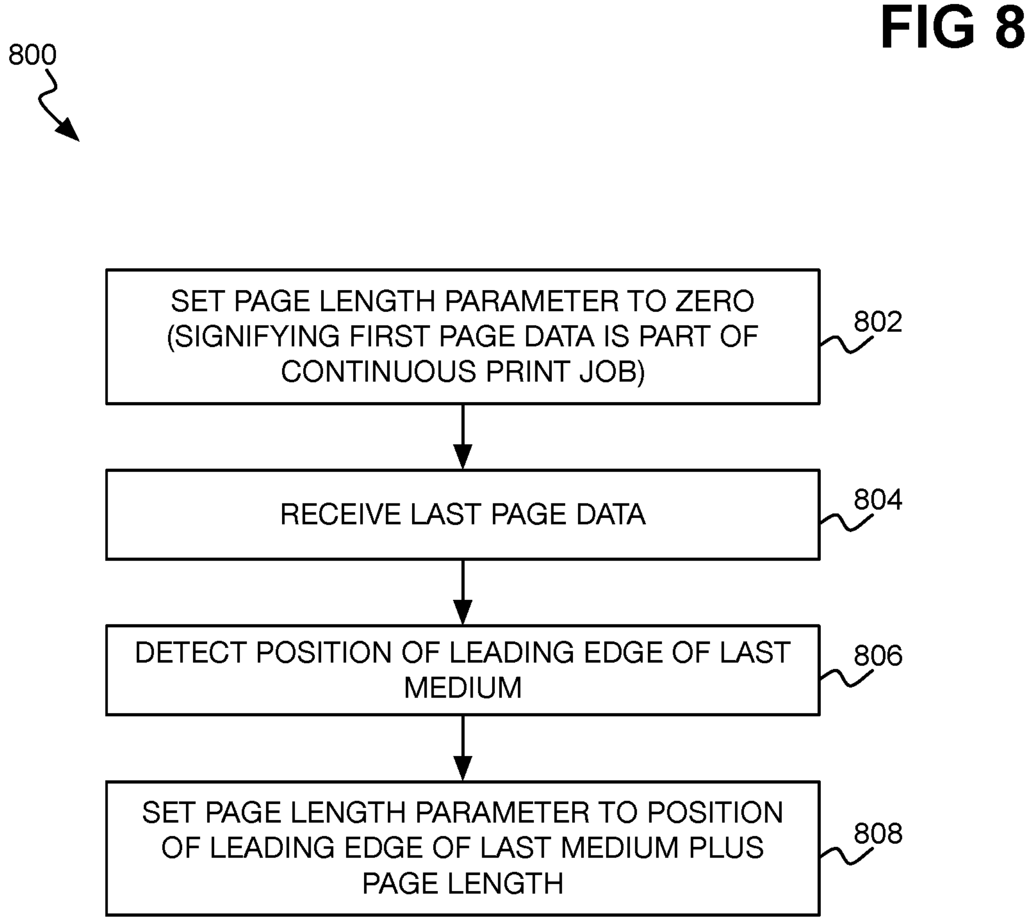
FIG. 8 is a flowchart of an example method for setting a page length parameter of printing hardware during continuous mode printing of a print job.

FIG. 8 shows an example method 800 for setting a page length parameter of printing hardware during continuous mode printing of a print job. The processor that executes the program code of FIG. 2 can also perform the method 800. The method 800 can be performed with the processing of FIG. 2, the method 400 of FIG. 4, and/or the method 600 of FIG. 6 in the same implementation. The printing hardware in FIG. 8 has a page length parameter that in non-continuous mode printing may be set to a medium's page length prior to the hardware printing on the medium, so that the hardware can track when printing of page data on the medium is finished.

However, in continuous mode printing, the printing hardware does not distinguish among media. From the standpoint of the printing hardware, the print job has one page that is printed on one medium, even though the print job in actuality has multiple pages with corresponding page data for printing on corresponding media. The printing hardware may still have to track when printing of page medium of the constructive single page of the print job has finished, however. The method 800 accordingly provides for setting of the page length parameter during continuous mode printing, even when the print job is of indefinite length (viz., of unknown length at the start of printing).

The method 800 includes setting the page length parameter of the printing hardware to zero at the start of the print job (802), such as when first page data is to be printed on a first medium. Such zero setting of the page length parameter signifies to the printing hardware that the first page data is part of a continuous print job (viz., that continuous mode printing is occurring). Printing of page data on media continues as page data is received and media have reached the print zone. At some point in time, the last page data of the continuous print job is received (804). The host computing device may indicate that the page data in question is for the last page of the print job, or the page data may be the last page data of the print job stored on a data storage device.

The method 800 includes detecting the position of the leading edge of a last medium advancing towards the print zone and on which the last page data is to be printed (806). The position of the leading edge of the last medium may be detected before the last page data is received—i.e., before part 804 is performed—in which case the medium is not known to be the last medium until the last page data that is to be printed on the medium has been received. In either case, the method 800 includes setting the page length parameter of the printing hardware to a position equal to the detected position of the leading edge of the last medium plus the length of the received last page data (808). The length of the last page data can correspond to the length of the last medium.

Therefore, when the leading edge of the last medium has reached the print zone, the printing hardware knows that printing that started with printing the first page data will be finished once the last page data has been printed. In this way, from the standpoint of the printing hardware the print job effectively has one page. The printing hardware does not distinguish between pages of the print job, because the hardware prints blank lines in correspondence with the gaps between adjacent media that are being advanced. In continuous mode printing, in other words, the printing hardware may start printing on the first medium and continuously print without pause until printing on the last medium has been completed.

Figure 9:
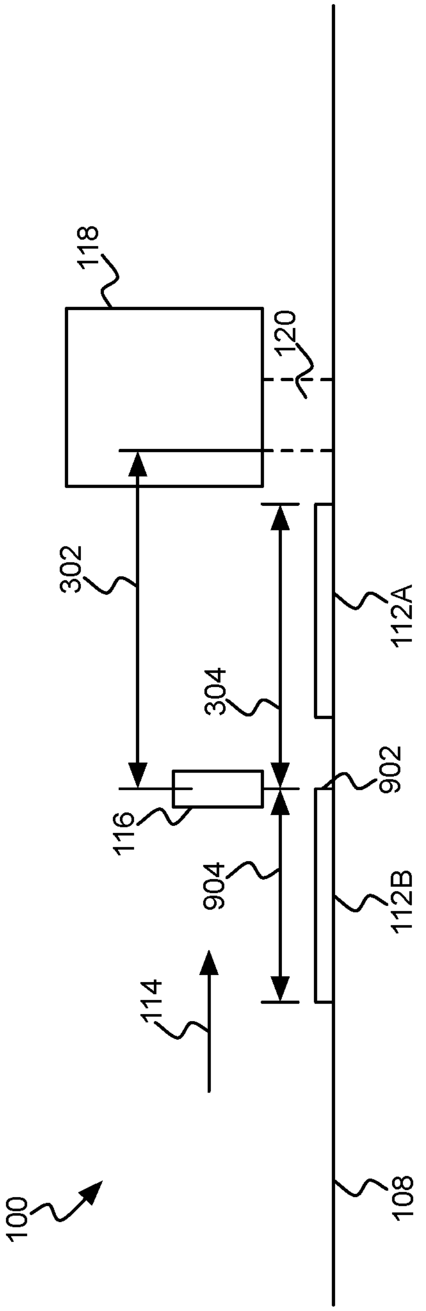
FIG. 9 is a diagram of example performance of the method of FIG. 8.

FIG. 9 shows example performance of the processing of FIG. 8 in relation to the printing system 100, a portion of which is depicted in FIG. 9. The first medium 112A and a second, last medium 112B are being advanced on the belt 102 towards the print zone 120 incident to the printing hardware 118, per arrow 114. In the example of FIG. 9, the print job has two pages for respective printing on the media 112A and 1126. The distance 302 between the leading edge sensor 116 and the print zone 120 is in FIG. 9 greater than the distance 304 between the leading edges of the media 112A and 112B, as FIG. 5. However, the distance 302 may instead be less than the distance 304, as in FIG. 3.

The page length parameter is initially set to zero. Upon the leading edge of the first medium 112A being detected, printing of the first page data commences once it has been determined that this leading edge has reached the print zone 120. The leading edge of the last medium 1126 is detected before printing of the first page data has started or has been completed 9, depending on how much greater the distance 302 is compared to the distance 304. Upon detection of the leading edge of the last medium 1126, the page length parameter is set to a position equal to the detected position 902 of the leading edge of the last medium 1126 plus the length 904 of the received last page data.

Figure 10:
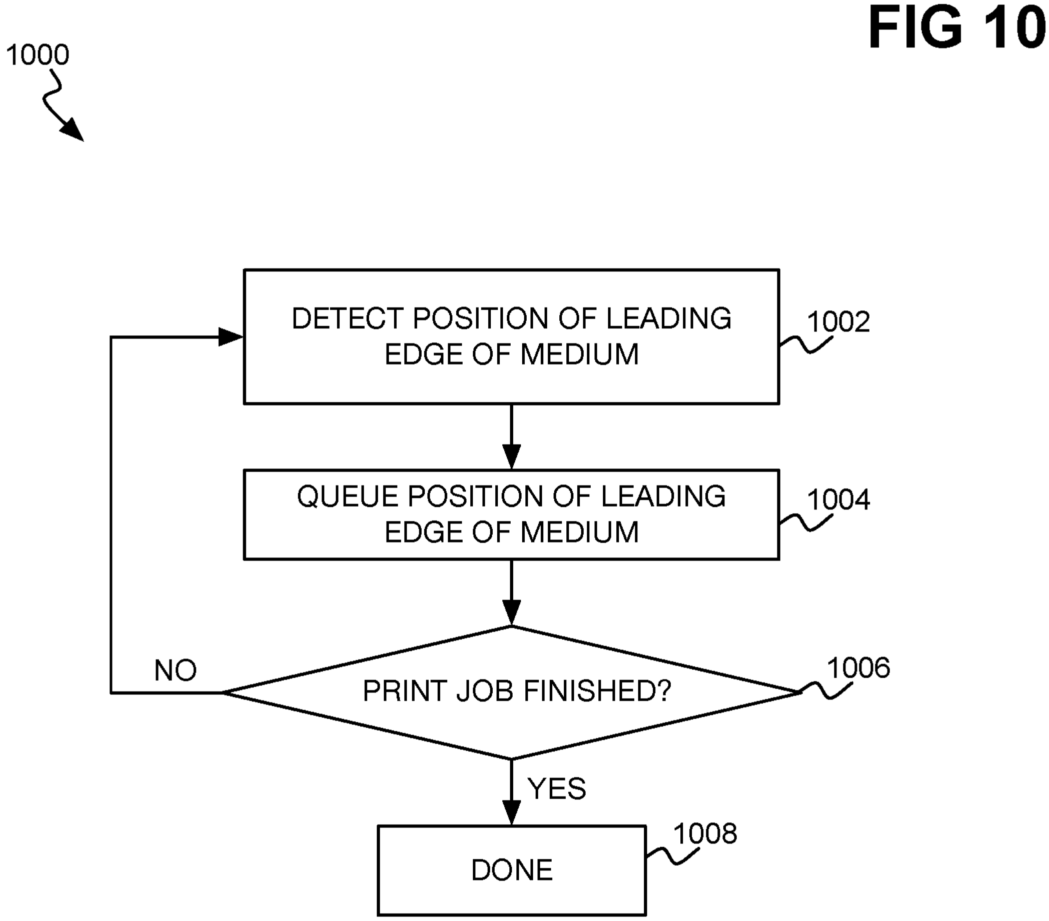
FIG. 10 is a flowchart of an example method for queuing detected positions of leading edges of media during continuous mode printing.
Figure 11:
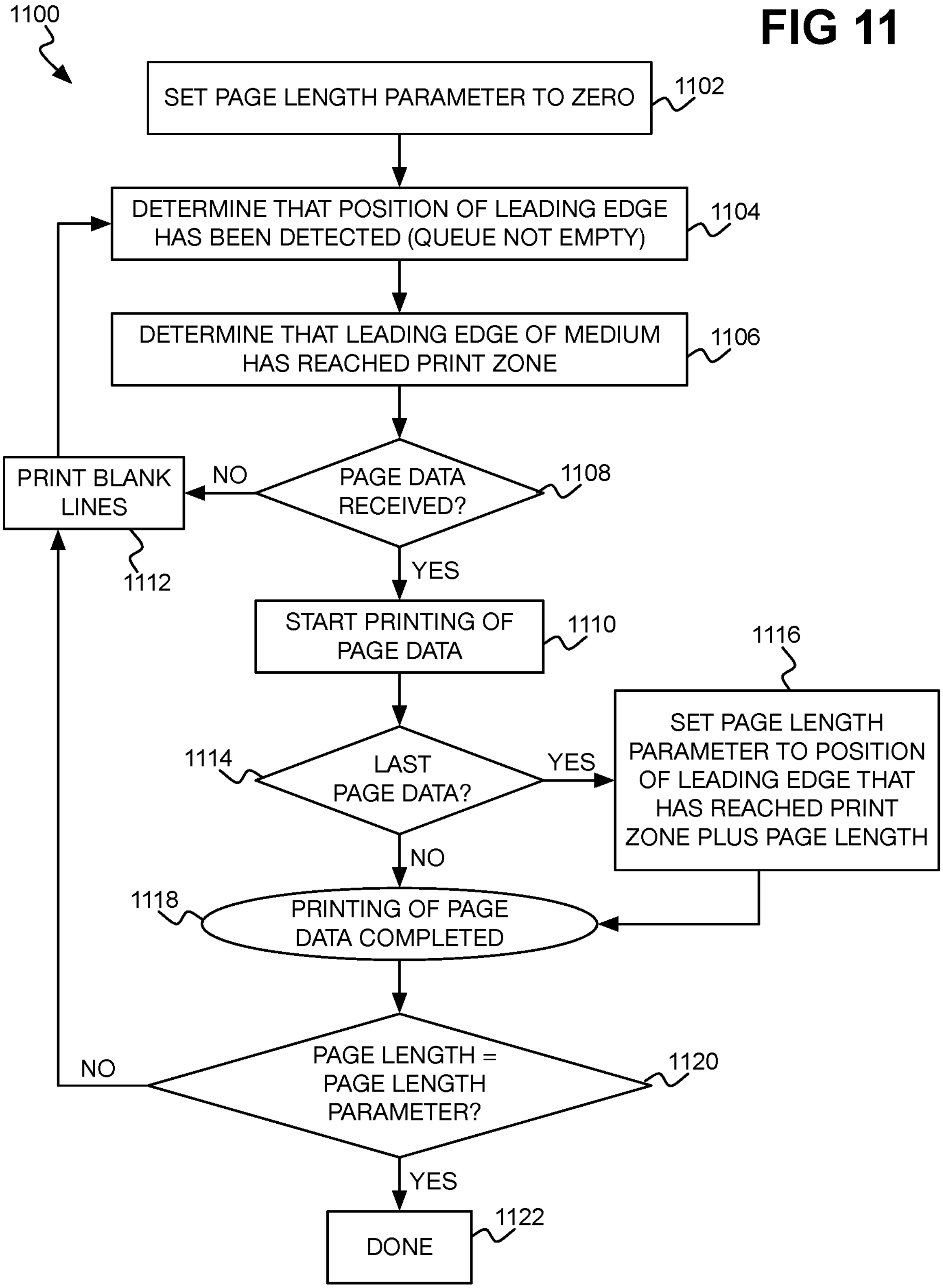
FIG. 11 is a flowchart of an example method for continuous mode printing that can be performed asynchronously with the method of FIG. 10 to encompass the processing of FIG. 2 and the methods of FIGS. 4, 6, and 8.

FIGS. 10 and 11 show respective example methods 1000 and 1100 that can be asynchronously performed to encompass the processing of FIG. 2 and the methods of FIGS. 4, 6, and 8. The methods 1000 and 1100 provide for continuous mode printing of a print job having multiple pages with corresponding page data, by printing the page data of the pages on respective media. The processor that executes the program code of FIG. 2 can perform the methods 1000 and 1100.

The method 1000 of FIG. 10 includes detecting a position of a leading edge of a medium being advanced towards a print zone (1002). The method 1000 responsively queues the detected position of the medium's leading edge within a queue (1004). The queue is a first-in, first-out (FIFO) queue. Once the print job has finished printing (1006), the method 1000 is itself finished (1008). For instance, the method 1000 is finished once the method 1100 of FIG. 11, which prints the print job, has finished.

Otherwise, the method 1000 proceeds back to part 1002, at which the position of the leading edge of the next medium being advanced towards the print zone is detected. The method 1000 therefore asynchronously detects and enqueues leading edges of media as they are advanced. The method 1100 of FIG. 11 can then successively dequeue the leading edges from the queue to determine when (or if) to print page data on the media having the detected leading edges.

The method 1100 includes initially setting the page length parameter of the printing hardware to zero (1102), to signify that the print job that is to be printed is a continuous print job. The method 1100 includes determining that the position of a leading edge of a medium has been detected (1104). Such determination can include detecting that the queue is not empty, and removing the oldest detected leading edge position from the queue. The medium having this leading edge is the medium closest to the print zone.

The method 1100 includes determining that the leading edge of this medium has reached the print zone (1106), based on the detected position of the leading edge. If at this time page data is available for printing on the medium (1108), the method 1100 includes then starting printing of the page data on the medium (1110). If no page data is available for printing on the medium (1108), the method 1100 includes instead printing blank lines (1112) to skip the medium, and the method 1100 proceeds back to part 1104 to determine whether the next medium's leading edge has been detected.

If the printing of the page data was started, if the page data is last page data (1114), the method 1100 includes then setting the page length parameter to the detected position of the medium's leading edge plus the page length of the page data (1116). The page data being printed on the medium is the last page data if the page data is for the last page of the print job. Once printing of the page data has been completed (1118), if the page length is equal to the page length parameter (1120), then the method 1100 is finished (1112). The method 1100 includes otherwise printing blank lines (1112) to skip the gap between the medium and the next medium, and the method 1100 proceeds back to part 1104 to determine whether the next medium's leading edge has been detected.

The printing hardware may indicate or report when the page length is equal to the page length parameter. The printing hardware may start tracking the page length with the leading edge position of the medium on which first page data is printed. The tracked page length then increases as the printing hardware prints lines of page data and blank lines. The page length cannot be equal to zero; until the page length parameter is set to a non-zero value, the method 1100 may not finish. The page length becomes equal to the value to which the parameter is set in part 1116 when the printing hardware has finished printing the last line of the last page data.

Figure 12:
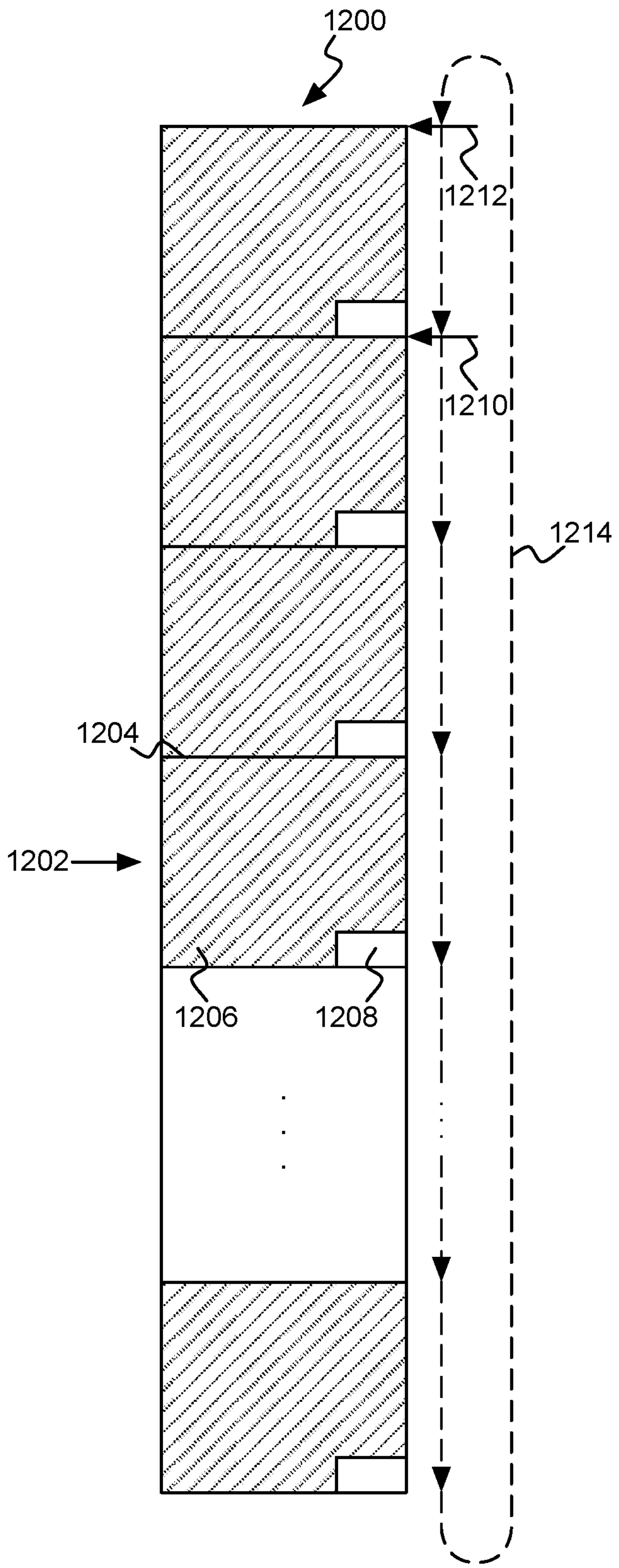
FIG. 12 is a diagram of an example page data buffer for use in continuous mode printing.

FIG. 12 shows an example page data buffer 1200 for use in continuous mode printing. The page data buffer 1200 stores page data of a print job to be printed. As noted, the print job may be received from a host computing device or retrieved from a data storage device. As the page data of the print job is received from the host computing device, or as the page data is retrieved from the data storage device, the page data is stored in the page data buffer 1200. The page data buffer 1200 can be a circular buffer; upon the end of the buffer 1200 being reached when storing or retrieving page data, the beginning of the buffer 1200 is circled back to for further page data storage or retrieval.

Specifically, the page data buffer 1200 can be divided into the maximum number of equally sized slots 1202 that are equal to or greater in size than a specified maximum page data size. Each slot 1202 includes a data region 1206 that stores actual page data of a print job. If the slots 1202 of the page data buffer 1200 are each greater in size than the specified maximum page data size, then each slot 1202 also includes a leftover region 1208 that does not store any page data.

The pages of a print job that can be continuously printed are of the same type, in that they are of equal length and have identically specified parameters (e.g., the same resolution, the same color (e.g., black and white or full color), and so on). For a given print job page type there is a corresponding maximum page data size. When a print job is to be printed, the type of its pages may be specified or can be determined to correspondingly divide the page data buffer 1200 into the number of slots 1202.

The page data buffer 1200 may be divided into slots 1202 so that no space of the buffer 1200 remains unassigned to any slot 1202. The page data of each page is completely stored in a slot 1202, and the last slot 1202 ends at the end of the buffer 1200. No page data for any page stored in the buffer 1200 is partially stored at the last slot 1202 at the end of the buffer 1200 and partially stored at the first slot 1202 at the beginning of the buffer 1200.

The page data buffer 1200 may be divided into slots 1202 so that inter-slot boundaries 1204 between adjacent slots 1202 occur at multiples of a specified number of bits. For example, the inter-slot boundaries may occur at 128-bit data words. Division of the page data buffer 1200 into slots 1202 as described can improve page data storage and retrieval to and from the page data buffer 1200, so that continuous print speed can be maximized for a given size and memory type of buffer 1200.

A next available slot pointer 1210 can reference the next available slot 1202 at which page data can be stored. When page data is stored at the slot 1202 that the next available slot pointer 1210 references, the pointer 1210 moves to the next slot 1202, and then circles back to the first slot 1202 after having reached the last slot 1202 of the buffer 1200, per the loop 1214. Page data can then be stored in the slot 1202 that pointer 1210 now references if the slot 1202 does not store page data that has not yet been printed.

An oldest populated slot pointer 1212 can reference the slot 1202 that stores the oldest page data of any slot 1202 of the buffer 1200. When page data stored at the slot 1202 that the oldest populated slot pointer 1212 references has been retrieved, the pointer 1212 moves to the next slot 1202, and then circles back to the first slot after having reached the last slot 1202 of the buffer 1200, also per the loop 1214. If the slot 1202 that the pointer 1212 now references stores page data, such page data will be retrieved next.

Figure 13:
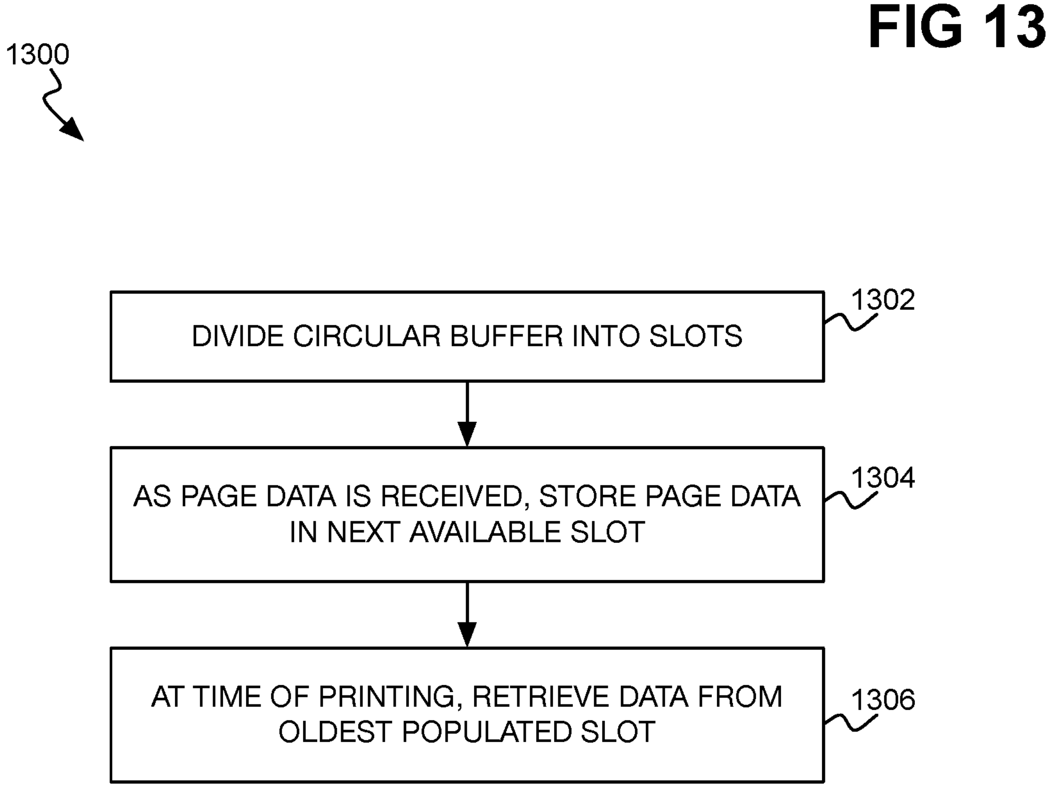
FIG. 13 is a flowchart of an example method for processing the page data buffer of FIG. 12 during continuous mode printing.

FIG. 13 shows an example method 1300 for processing a circular buffer during continuous mode printing. The circular buffer may be the page data buffer 1200 of FIG. 12. The processor that executes the program code of FIG. 2 can also perform the method 1300. Parts of the method 1300 may be asynchronously performed along with the methods of FIGS. 10 and 11 that encompass the processing of FIG. 2 and the methods of FIGS. 4, 6, and 8.

The method 1300 can include dividing the circular buffer into slots of equal size greater than or equal to the page data size of the pages of a print job (1302), as has been described. As page data is received, the method 1300 can include storing the page data into the next available slot of the buffer (1304). The circular buffer circles back to the first slot after the last slot has been reached. At time of printing on a next medium, the method 1300 can include retrieving the page data from the oldest populated slot for printing on this medium (1306).

Figure 14:
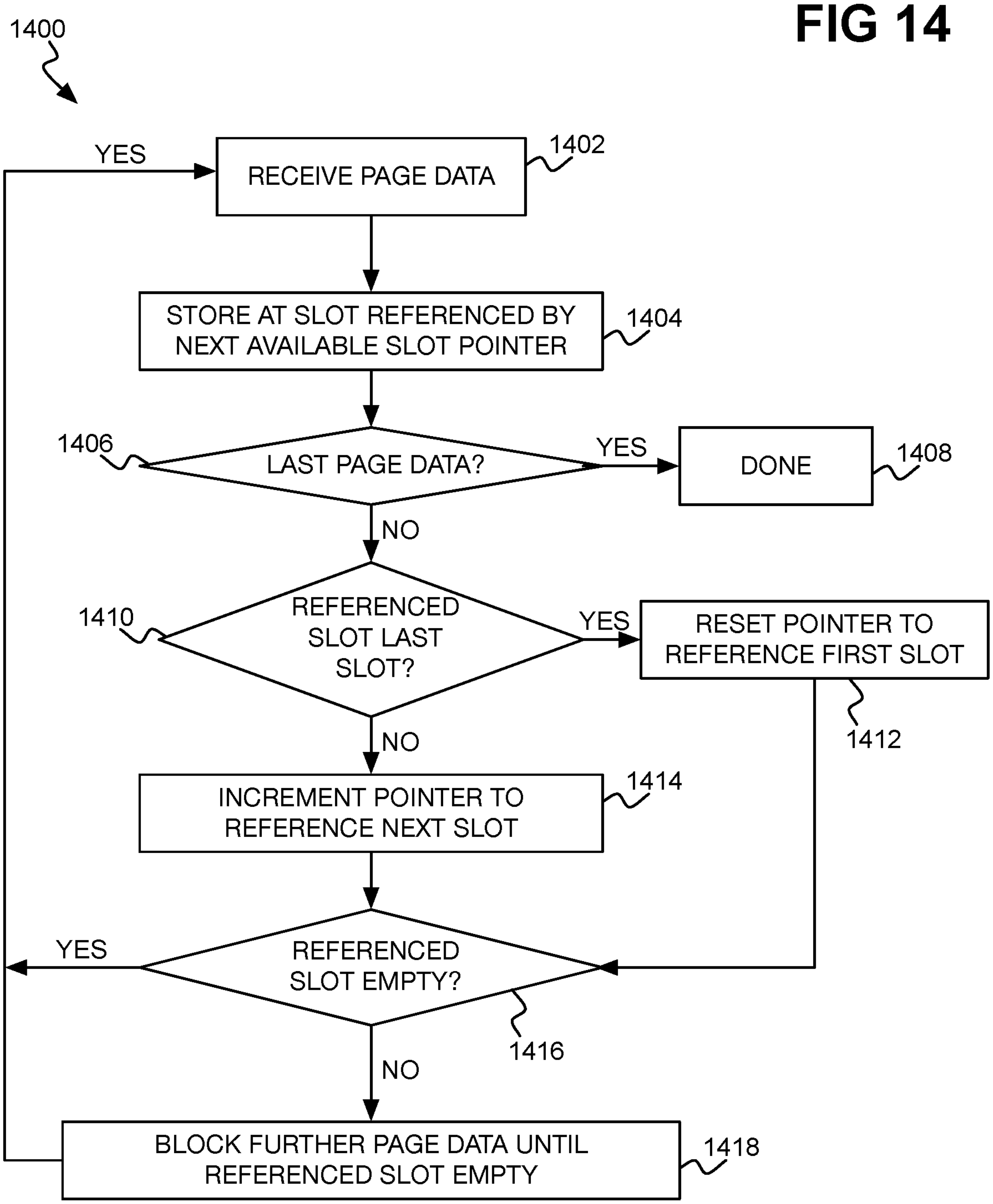
FIG. 14 is a flowchart of an example method for loading received page data into the page data buffer of FIG. 12 during continuous mode printing, and which can implement a part of the method of FIG. 13.

FIG. 14 shows an example method 1400 for loading received page data into a circular buffer during continuous mode printing. The circular buffer may be the page data buffer 1200 of FIG. 12. The method 1400 can implement part 1304 of FIG. 13. The processor that executes the program code of FIG. 2 can also perform the method 1400. The method 1400 may be asynchronously performed with the methods of FIGS. 10 and 11 as page data is received from a host computing device or retrieved from a data storage medium.

The method 1400 includes receiving page data for a page of a print job (1402), and storing the page data at the slot referenced by a next available slot pointer (1404). If the page data is the last page data (1406)—i.e., the page data for the last page of the print job—then the method 1400 is finished (1408). Otherwise, if the slot referenced by the next available slot pointer is the last slot of the circular buffer (1410), the method 1400 includes then resetting the pointer to reference the first slot of the buffer (1412). However, if the slot referenced by the next available slot pointer is not the last slot (1410), the method 1400 includes then incrementing the pointer to reference the next slot (1414).

If the slot not referenced by the next available slot pointer is empty (1416), then the method 1400 proceeds back to part 1402 at which page data for the next page of the print job can be received. A slot is empty if it stores no page data. A slot is also considered empty if it stores page data that has already been printed on a medium. In this case, the slot is available for storage of different page data, and therefore is effectively empty.

If the slot now referenced by the next available slot pointer is not empty (1418), however, then this means that the slot stores data that has not yet been printed on a medium. In this case, if page data for the next page were received there would not be anywhere to store the page data within the circular buffer. The page data cannot be stored in the slot referenced by the pointer, because doing so would overwrite page data that has not yet been printed on a medium.

Therefore, in this case the method 1400 includes blocking receipt of further page data (i.e., the page data of the next page of the print job), until the slot referenced by the next available slot becomes empty (1418). The slot becomes empty once the page data that the slot currently stores has been printed on a medium. Once the slot has become empty, additional page data receipt can be unblocked and the method 1400 can proceed back to part 1402 at which such page data can be received.

Figure 15:
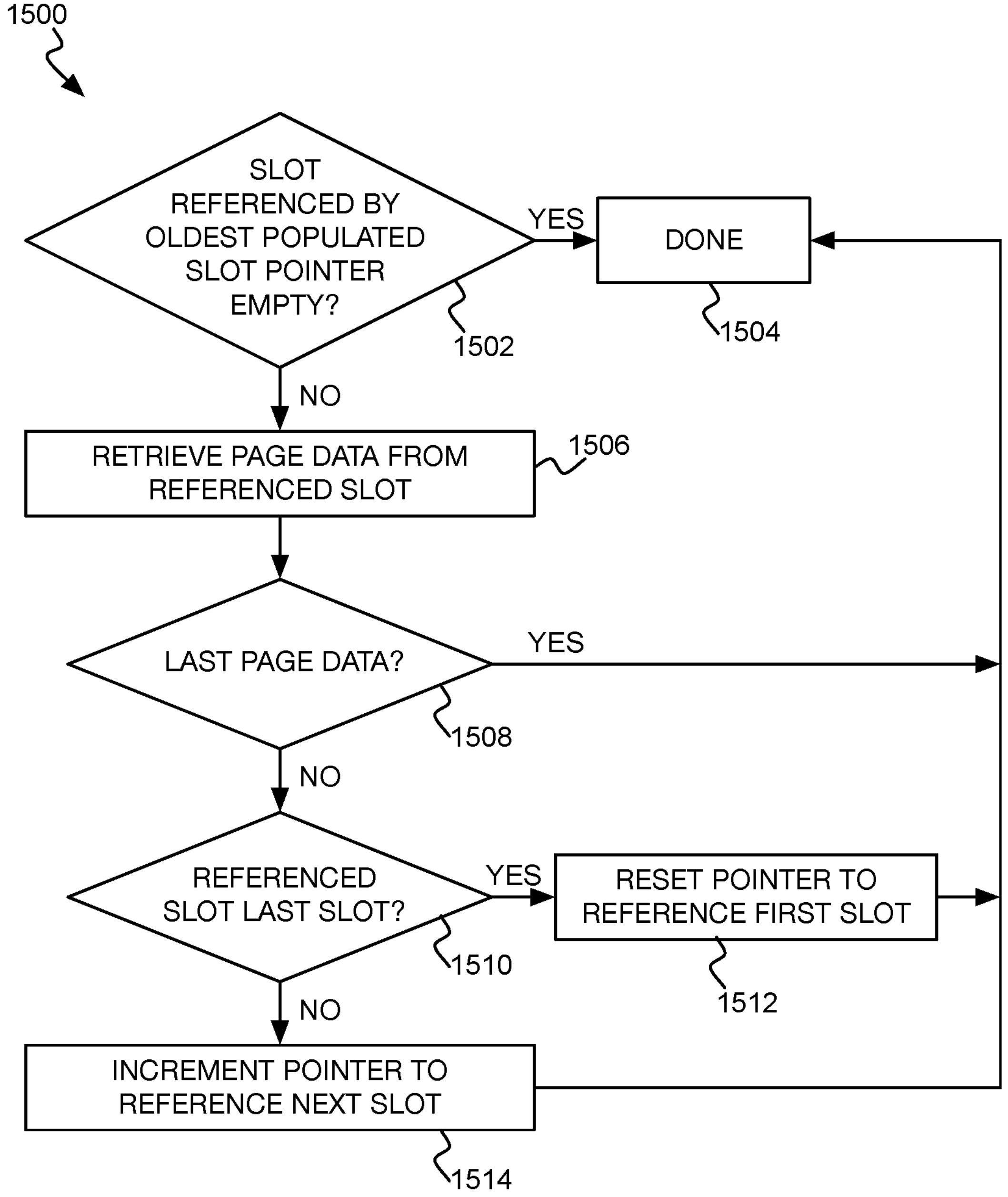
FIG. 15 is a flowchart of an example method for retrieving page data from the page data buffer of FIG. 12 during continuous mode printing, and which can implement a part of the method of FIG. 13.

FIG. 15 is a flowchart of an example method 1500 for retrieving page data from a circular buffer during continuous mode printing. The circular buffer may be the page data buffer 1200 of FIG. 12. The method 1500 can implement part 1306 of FIG. 13. The processor that executes the program code of FIG. 2 can also perform the method 1400. The method 1500 can be performed each time page data is to be printed in the methods of FIGS. 2, 4, 6, and 11.

If the slot referenced by an oldest populated slot pointer is empty (1502), then the method 1500 is finished (1504), without having retrieved any page data. As noted, a slot is empty if it stores no page data or stores page data that has already been printed on a medium. In this case, a medium that has reached the print zone may not be printed on, as has been described with reference to the methods of FIGS. 6 and 11. If the slot referenced by the oldest populated slot pointer is not empty (1502), however, the method 1500 includes then retrieving the page data stored in this slot (1506).

If the retrieved page data is the last page data (1508)—i.e., the page data for the last page of the print job—then the method 1500 is also finished (1504), with the last page of the print job having been retrieved. Otherwise, if the slot referenced by the oldest populated slot pointer is the last slot of the circular buffer (1510), the method 1500 includes then resetting the pointer to reference the first slot of the buffer (1512). However, if the slot referenced by the oldest populated slot pointer is not the last slot (1510), the method 1500 includes then incrementing the pointer to reference the next slot (1514). In either case, the method 1500 is finished (1504), with a page of the print job having been retrieved.

Techniques have been described for continuous mode printing in which media are continuously advanced at a constant speed through a print zone. The techniques include image registration techniques (e.g., the processing of FIG. 2 and the methods of FIGS. 4, 10, and 11) to ensure that page data is printed when a medium reaches the print zone. The techniques include page data underrun techniques (e.g., the methods of FIGS. 6 and 11) to skip a medium that has reached the print zone if no page data is available.

The techniques include page length parameter-setting techniques (e.g., the methods of FIGS. 8 and 11) to indicate to printing hardware when printing of a print job will be finished. The techniques include page data buffer-related techniques (e.g., the methods of FIGS. 13, 14, and 15) to manage storage and retrieval of page data to and from a buffer during continuous mode printing. Such page data storage and retrieval management can be performed during the continuous mode printing of FIGS. 10 and 11.

We claim:

1. A printing system comprising:

a belt or a plurality of rollers onto which sheets of media are loaded;

a motor to rotate the belt or the rollers to continuously advance the sheets of media at a constant speed;

a leading edge sensor to detect leading edges of the sheets of media as the sheets of media are advanced;

printing hardware to respectively print a plurality of pages of a print job onto the sheets of media as the sheets of media are advanced through a print zone incident to the printing hardware; and logic hardware to cause the printing hardware to:

print on the sheets of media in a continuous mode in which the belt or the rollers are not stopped until printing of the print job has been completed, such that the belt or the rollers continue to rotate between adjacent pages of the print job and between adjacent sheets; and print blank lines onto the sheets of media upon completion of printing a first page onto a first sheet of media until the leading edge sensor has detected a position of a leading edge of a second sheet of media.

2. The printing system of claim 1, wherein a distance between the leading edge sensor and the print zone is configurable between print jobs.

3. The printing system of claim 1, wherein the print job is of indefinite length as to a number of the pages of the print job.

4. The printing system of claim 1, wherein upon the leading edge sensor detecting a position of a leading edge of a first sheet of media advancing towards the print zone, the logic hardware is to cause the printing hardware to start printing first page data responsive to determining that the leading edge of the first sheet of media has reached the print zone, based on the detected position of the leading edge of the first sheet of media, and wherein the logic hardware is to cause the printing hardware to start printing second page data responsive to determining that the leading edge of the second sheet of media has reached the print zone, based on the detected position of the leading edge of the second sheet of media.

5. The printing system of claim 4, wherein in response to the leading edge sensor detecting a position of a leading edge of a third sheet of media advancing towards the print zone prior to starting or completion of printing of the second page data, the logic hardware is to queue the position of the leading edge of the third sheet of media, wherein upon completion of printing of the second page data, the logic hardware is to cause the printing hardware to print blank lines until the leading edge of the second sheet of media has reached the print zone, and wherein the logic hardware is to cause the printing hardware to start printing of third page data responsive to determining that the leading edge of the third media has reached the print zone, based on the detected position of the leading edge of the third sheet of media as queued.

6. The printing system of claim 1, further comprising:

a circular buffer divided into a plurality of slots of equal size equal to or greater than a page data size of the print job, wherein as the logic hardware receives page data for each page, the logic hardware is to store the page data in a next available slot of the circular buffer, the circular buffer circling back to a first slot after a last slot has been reached, and wherein at time of printing on a next sheet of media, the logic hardware is to retrieve the page data from an oldest populated slot for the printing hardware to print on the next sheet of media.

7. The printing system of claim 6, wherein the logic hardware is to store the page data in the next available slot by:

storing the page data at a current slot referenced by a next available slot pointer;

if the current slot is the last slot, resetting the next available slot pointer to reference the first slot; and if the current slot is not the next slot, incrementing the next available slot pointer to reference a next slot of the circular buffer.

8. The printing system of claim 6, wherein the logic hardware is to retrieve the page data from the oldest populated slot by:

retrieving the page data from a current slot referenced by an oldest populated slot pointer;

if the current slot is the last slot, resetting the oldest populated slot pointer to reference the first slot; and if the current slot is not the last slot, incrementing the oldest populated slot pointer to reference a next slot of the circular buffer.

9. A non-transitory computer-readable data storage medium storing program code executable by a processor to perform continuous mode printing processing comprising:

upon detection of a position of a leading edge of a first medium advancing towards a print zone, starting printing of first page data responsive to determining that the leading edge of the first medium has reached the print zone, based on the detected position of the leading edge of the first medium;

upon completion of printing of the first page data, printing blank lines until a position of a leading edge of a second medium advancing towards the print zone has been detected and the leading edge of the second medium has reached the print zone; and starting printing of second page data responsive to determining that the leading edge of the second medium has reached the print zone, based on the detected position of the leading edge of the second medium.

10. The non-transitory computer-readable data storage medium of claim 9, wherein the processing further comprises:

in response to detection of a position of a leading edge of a third medium advancing towards the print zone prior to starting or completion of printing of the second page data, queuing the position of the leading edge of the third medium;

upon completion of printing of the second page data, printing blank lines until the leading edge of the second medium has reached the print zone; and starting printing of third page data responsive to determining that the leading edge of the third medium has reached the print zone, based on the detected position of the leading edge of the third medium as queued.

11. The non-transitory computer-readable data storage medium of claim 10, wherein the first, second, and third media advance towards and through the print zone at a constant speed.

12. The non-transitory computer-readable data storage medium of claim 10, wherein a distance at which media leading edges are detectable in advance of the print zone is greater than an inter-media distance of media advancing towards the print zone.

13. The non-transitory computer-readable data storage medium of claim 9, wherein a distance at which media leading edges are detectable in advance of the print zone is less than an inter-media distance of media advancing towards the print zone.

14. The non-transitory computer-readable data storage medium of claim 9, wherein the processing further comprises:

upon completion of printing of the second page data, printing blank lines until a position of a leading edge of a third medium advancing towards the print zone has reached the print zone;

in response to third page data being unavailable, continuing to print blank lines responsive to determining that the third medium has reached the print zone; and upon the third page data becoming available, and in response to detection of a position of a leading edge of a fourth medium advancing towards the print zone, starting printing of the third page data responsive to determining that the leading edge of the fourth medium has reached the print zone, based on the detected position of the leading edge of the fourth medium.

15. The non-transitory computer-readable data storage medium of claim 9, wherein the continuous mode printing processing comprises:

setting a page length parameter to zero, signifying that the first page data is part of a continuous print job; and upon receiving last page data of the continuous print job, and in response to detection of a position of a leading edge of a last medium advancing towards the print zone and on which the last page data is to be printed, setting the page length parameter to a position equal to the position of the leading edge of the last medium plus a length of the received last page data.

* * * * *